(12) United States Patent
Choi et al.

(10) Patent No.: US 9,066,338 B2
(45) Date of Patent: Jun. 23, 2015

(54) METHOD FOR TRANSMITTING RESOURCE ALLOCATION INFORMATION IN A WIRELESS MOBILE COMMUNICATION SYSTEM THAT SUPPORTS A PLURALITY OF COMMUNICATION MODES

(75) Inventors: Jin Soo Choi, Anyang-si (KR); Han Gyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 13/125,566

(22) PCT Filed: Oct. 22, 2009

(86) PCT No.: PCT/KR2009/006128
§ 371 (c)(1),
(2), (4) Date: Apr. 21, 2011

(87) PCT Pub. No.: WO2010/047546
PCT Pub. Date: Apr. 29, 2010

(65) Prior Publication Data
US 2011/0200001 A1 Aug. 18, 2011

Related U.S. Application Data

(60) Provisional application No. 61/107,351, filed on Oct. 22, 2008.

(30) Foreign Application Priority Data

Oct. 21, 2009 (KR) ........................ 10-2009-0100394

(51) Int. Cl.
*H04J 4/00* (2006.01)
*H04W 72/04* (2009.01)
*H04L 5/00* (2006.01)
*H04W 4/06* (2009.01)
*H04W 88/10* (2009.01)

(52) U.S. Cl.
CPC .............. *H04W 72/042* (2013.01); *H04W 4/06* (2013.01); *H04W 88/10* (2013.01); *H04L 5/0028* (2013.01); *H04L 5/0037* (2013.01); *H04L 5/0078* (2013.01); *H04L 5/0092* (2013.01)

(58) Field of Classification Search
USPC ......... 370/321, 326, 330, 336, 343–345, 436, 370/437, 442, 478, 498
See application file for complete search history.

(56) References Cited

U.S. PATENT DOCUMENTS

| | | | |
|---|---|---|---|
| 2007/0070908 A1 | 3/2007 | Ghosh et al. | |
| 2008/0130486 A1* | 6/2008 | Lim et al. | 370/210 |
| 2008/0170545 A1* | 7/2008 | Kim et al. | 370/329 |
| 2008/0247340 A1 | 10/2008 | Choi et al. | |
| 2009/0135807 A1* | 5/2009 | Shrivastava et al. | 370/352 |
| 2009/0196262 A1* | 8/2009 | Chin et al. | 370/336 |
| 2009/0257366 A1* | 10/2009 | Power et al. | 370/280 |
| 2010/0246533 A1* | 9/2010 | Lundin et al. | 370/332 |

FOREIGN PATENT DOCUMENTS

| | | |
|---|---|---|
| KR | 1020080078194 | 8/2008 |
| KR | 10-2008-0082943 | 9/2008 |
| KR | 1020080090731 | 10/2008 |

* cited by examiner

*Primary Examiner* — Peter Cheng
(74) *Attorney, Agent, or Firm* — Lee, Hong, Degerman, Kang & Waimey

(57) ABSTRACT

The present invention relates to a method for transmitting resource allocation information between a mobile communication device and a base station in a wireless mobile communication system that supports a plurality of communication modes. The method comprises the steps of: creating information relating to the number of resource units available for the mobile communication device operating in a second communication mode from all of the whole resource units which can be used by a first mobile communication device operating in a first communication mode and a second mobile communication device operating in the second communication mode; and broadcasting the information relating to the number of available resource units created in the previous step.

12 Claims, 17 Drawing Sheets

FIG. 20

TOTAL NUMBER #N
OF SUB-CHANNELS

| SUB-CHANNEL #0 |
| SUB-CHANNEL #1 |
| SUB-CHANNEL #2 |
| SUB-CHANNEL #N-3 |
| SUB-CHANNEL #N-2 |
| SUB-CHANNEL #N-1 |

SUB-CHANNELS FOR 16e SYSTEM

SUB-CHANNELS FOR 16m SYSTEM

SUB-CHANNEL BITMAP →

| 0 |
| 0 |
| 0 |
| 1 |
| 1 |
| 1 |

FIG. 21

TOTAL NUMBER #N
OF SUB-CHANNELS

| SUB-CHANNEL #0 |
| SUB-CHANNEL #1 |
| SUB-CHANNEL #2 |
| SUB-CHANNEL #N-3 |
| SUB-CHANNEL #N-2 |
| SUB-CHANNEL #N-1 |

SUB-CHANNELS FOR 16e SYSTEM

SUB-CHANNELS FOR 16m SYSTEM
(3 SUB-CHANNELS)

3 SUB-CHANNELS
—
11 (IN THE EVENT OF USING BITMAP)

| 1 |
| 1 |

PROPOSAL
(SIGNALING INFORMATION
REGARDING NUMBER OF
AVAILABLE SUB-CHANNELS
TO 16m MS)

US 9,066,338 B2

METHOD FOR TRANSMITTING RESOURCE ALLOCATION INFORMATION IN A WIRELESS MOBILE COMMUNICATION SYSTEM THAT SUPPORTS A PLURALITY OF COMMUNICATION MODES

CROSS-REFERENCE TO RELATED APPLICATIONS

This application is the National Stage filing under 35 U.S.C. 371 of International Application No. PCT/KR2009/006128, filed on Oct. 22, 2009, which claims the benefit of earlier filing date and right of priority to Korean Application No. 10-2009-0100394, filed on Oct. 21, 2009, and also claims the benefit of U.S. Provisional Application Ser. No. 61/107,351, filed on Oct. 22, 2008, the contents of all of which are incorporated by reference herein in their entirety.

TECHNICAL FIELD

The present invention relates to a method for transmitting resource allocation information in a wireless mobile communication system that supports a plurality of communication modes.

BACKGROUND ART

The 802.16m Amendment shall be developed in accordance with the P802.16 Project Authorization Request (PAR), as approved on 6 Dec. 2006, and with the Five Criteria Statement in IEEE 802.16-06/055r3. According to the PAR, the standard shall be developed as an amendment to IEEE Std. 802.16. This amendment provides continuing support for legacy WirelessMAN-OFDMA equipment.

In a conventional IEEE 802.16e system, a basic slot structure and a data region are defined as follows. A "slot" within an Orthogonal Frequency Division Multiple Access (OFDMA) physical layer (PHY) requires both time and sub-channel dimension for completeness and serves as the minimum possible data allocation unit. The definition of an OFDMA slot depends on the OFDMA symbol structure, which varies for UL (UpLink) and DL (DownLink), for FUSC (Full Usage of Sub-Channels) and PUSC (Partial Usage of Sub-Channels), and for the distributed sub-carrier permutations and the adjacent sub-carrier permutation (AMC).

For DL FUSC and DL optional FUSC using the distributed sub-carrier permutation, one slot is one sub-channel by one OFDMA symbol. For DL PUSC using the distributed sub-carrier permutation, one slot is one sub-channel by two OFDMA symbols. For UL PUSC using either of the distributed sub-carrier permutations and for DL TUSC1 (Tile Use of Sub-Channels 1) and TUSC2, one slot is one sub-channel by three OFDMA symbols. For the adjacent sub-carrier permutation (AMC), one slot is one sub-channel by two, three, or six OFDMA symbols.

In OFDMA, a data region is a two-dimensional allocation of a group of contiguous sub-channels, in a group of contiguous OFDMA symbols. At this time, logical sub-channels are allocated. Two-dimensional allocation may be visualized as a rectangle, such as is shown in FIG. 1.

In the related art, basic data allocation structures and/or pilot structures vary according to permutation rules such as PUSC, FUSC, AMC, etc. This is because permutation rules were separated in the time axis in the related art 16e system so that the structures were designed to be optimized according to each permutation rule. FIG. 2 shows an exemplary related art data allocation structure. Permutation rules are separated in the time axis in the related art method. However, if more than one permutation rules exist on the same time zone, one unified basic data allocation structure and pilot transmission structure are required.

When multiplexing 16e system and 16m system, it is desirable to design time-frequency granularity of a PRU of a 16m system so that the PRU of the 16m system is compatible with a 16e system. In addition, it is desirable to design multiplexing structures such that performance deterioration of each of the 16e system and the 16m system, which are multiplexed, be made as low as possible.

In addition, in an environment (in particular, in uplink) in which the 16e system and the 16m system are multiplexed and operated in a mixed mode in the same frame or the same sub-frame, available resource units or sub-channels need to be signaled to a mobile station (MS) of the 16m system. If a bitmap indicating available sub-channels among all sub-channels is signaled to the MS, the size of the bitmap is increased and thus signaling overhead is increased.

DISCLOSURE

Technical Problem

An object of the present invention devised to solve the problem lies in a method of transmitting resource allocation information, which is capable of minimizing signaling overhead in an environment in which a legacy system and a new system coexist.

Technical Solution

The object of the present invention can be achieved by providing a method for transmitting resource allocation information in a wireless mobile communication system that supports a plurality of communication modes, including creating information relating to the number of resource units available for a mobile communication device operating in a second communication mode among all resources units which can be used by a first mobile communication device operating in a first communication mode and a second mobile communication device operating in the second communication mode, and broadcasting the created information relating to the number of available resource units.

In another aspect of the present invention, provided herein is a method for receiving resource allocation information in a wireless mobile communication system that supports a plurality of communication modes, including receiving, from a base station, information relating to the number of resource units available for a mobile communication device operating in a second communication mode among all resources units which can be used by a first mobile communication device operating in a first communication mode and a second mobile communication device operating in the second communication mode through a broadcast, and recognizing positions of the available resource units using the information.

In another aspect of the present invention, provided herein is a mobile communication device which wirelessly communicates with a base station, including a Radio Frequency (RF) unit configured to receive information relating to the number of resource units available for a mobile communication device operating in a second communication mode among all resources units which can be used by a first mobile communication device operating in a first communication mode and a second mobile communication device operating in the second communication mode through a Super Frame Header (SFH), and a processor electrically connected to the RF unit and configured to recognize positions of the available resource units using the information.

In another aspect of the present invention, provided herein is a base station which wirelessly communicates with a mobile communication device, including a processor configured to create information relating to the number of resource units available for a mobile communication device operating in a second communication mode among all resources units which can be used by a first mobile communication device operating in a first communication mode and a second mobile communication device operating in the second communication mode, and a Radio Frequency (RF) electrically connected to the processor and configured to broadcast the information.

The information may indicate the number of resource units available for a mobile communication device operating in the second communication mode.

If the number of resource units available for the mobile communication device operating in the second communication mode is greater than the number of resource units available for the mobile communication device operating in the first communication mode, the information may indicate the number of resource units available for the mobile communication device operating in the first communication mode.

The information may be configured in bitmap format.

The information may be broadcast through a Primary-Super Frame Header (P-SFH).

The information may be broadcast through a Secondary-Super Frame Header (S-SFH).

Advantageous Effects

According to the method for transmitting resource allocation information of the present invention, it is possible to minimize signaling overhead in an environment in which a legacy system and a new system coexist.

DESCRIPTION OF DRAWINGS

FIG. 20 is a diagram illustrating a method of configuring all sub-channels in a bitmap format and configuring available resource allocation information.

FIG. 21 is a diagram illustrating a method for transmitting resource allocation information according to an embodiment of the present invention.

BEST MODE

Figure 1:
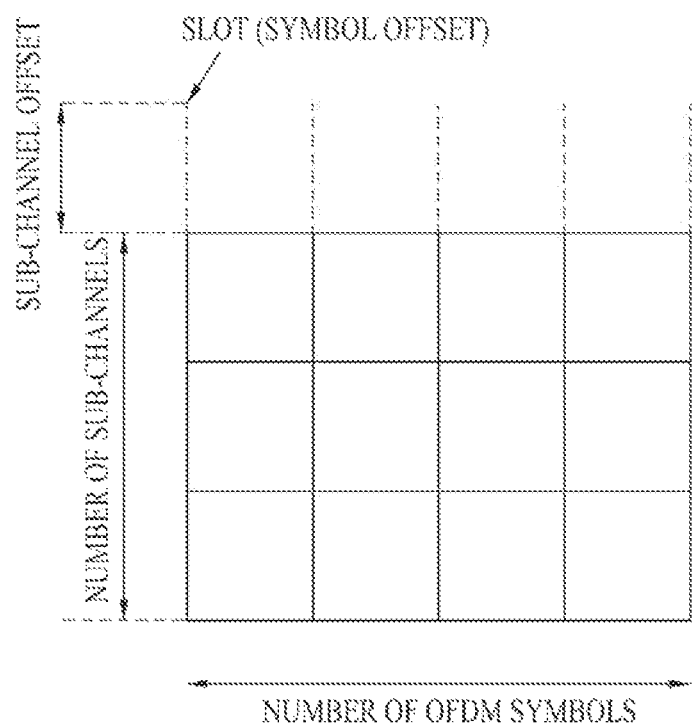
FIG. 1 is a diagram for comparing performance in terms of diversity gain according to combinations of packet sizes and available bandwidths for a user.
Figure 2:
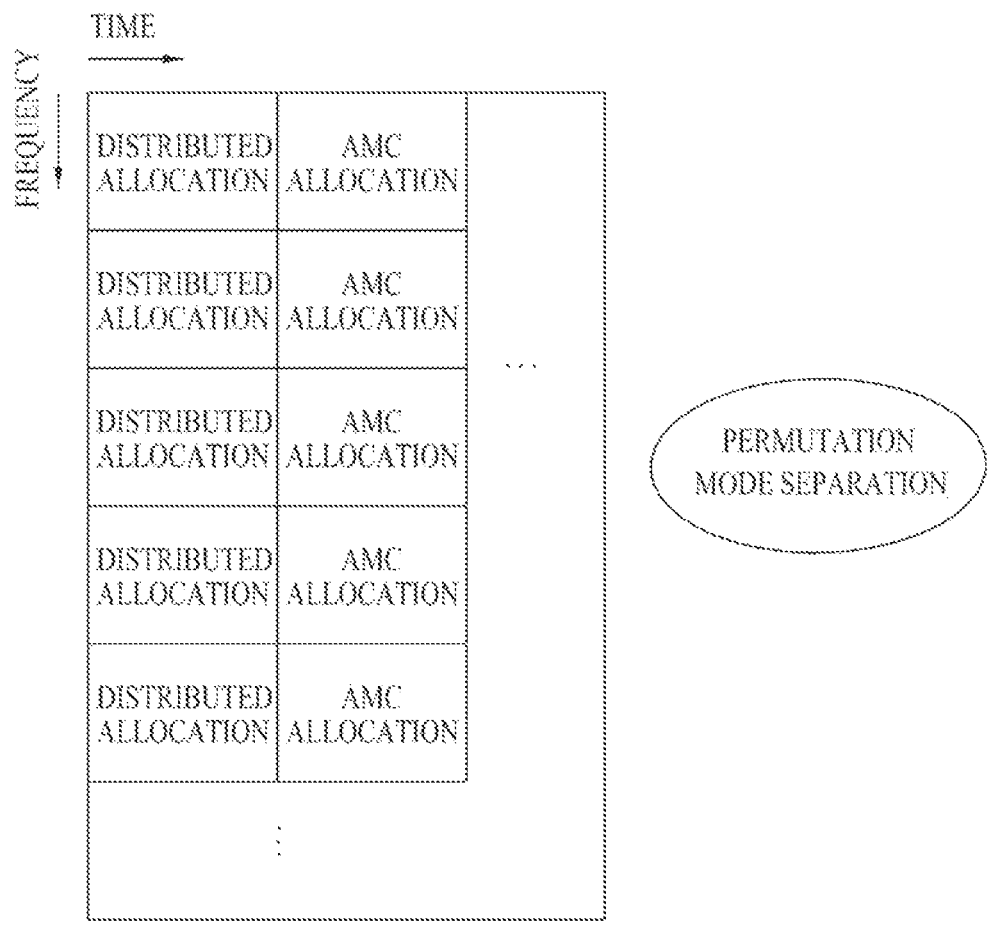
FIG. 2 shows an exemplary related art data allocation structure.

The accompanying drawings, which are included to provide a further understanding of the invention and are incorporated in and constitute a part of this application, illustrate embodiments of the invention and together with the description serve to explain the principle of the invention.

The accompanying drawings are included to provide a further understanding of the invention. The accompanying drawings illustrate embodiments of the invention and together with the description serve to explain the principle of the invention.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In this document, "Legacy MS" refers to a mobile station (MS) compliant with the WirelessMAN-OFDMA Reference System, "Legacy BS" refers to a BS compliant with the WirelessMAN-OFDMA Reference System, "IEEE 802.16m MS" refers to an MS compliant with the Advanced Air Interface amended by IEEE 802.16-2004, IEEE 802.16e-2005 and IEEE 802.16m, and "IEEE 802.16m BS" refers to a BS compliant with the Advanced Air Interface amended by IEEE 802.16-2004, IEEE 802.16e-2005 and IEEE 802.16m.

IEEE 802.16m may provide continuing support and interoperability for legacy WirelessMAN-OFDMA equipment, including MSs (Mobile Station) and BSs (Base Station). Specifically, the features, functions and protocols enabled in IEEE 802.16m may support the features, functions and protocols employed by WirelessMAN-OFDMA legacy equipment. IEEE 802.16m may provide the ability to disable legacy support.

The backward compatibility may satisfy the following requirements:

An IEEE 802.16m MS shall be able to operate with a legacy BS, at a level of performance equivalent to performance obtained in a relationship between a legacy MS and a legacy BS.

Systems based on IEEE 802.16m and the WirelessMAN-OFDMA Reference System shall be able to operate on the same RF (Radio Frequency) carrier, with the same channel bandwidth, and should be able to operate on the same RF carrier with different channel bandwidths.

An IEEE 802.16m BS shall support a mix of IEEE 802.16m and legacy MSs when the IEEE 802.16m and the legacy MSs are operating on the same RF carrier. System performance with such a mix should improve with the fraction of IEEE 802.16m MSs linked to the BS.

An IEEE 802.16m BS shall support handover of a legacy MS to and from a legacy BS and to and from an IEEE 802.16m BS, at a level of performance equivalent to handover between two legacy BSs.

An IEEE 802.16m BS shall be able to support a legacy MS while also supporting IEEE 802.16m MSs on the same RF carrier, at a level of performance equivalent to that a legacy BS provides to a legacy MS. To support backward compatibility, multiplexing of 16e and 16m is required. Such multiplexing can be performed by two multiplexing schemes, that is, TDM (Time Division Multiplexing) and/or FDM (Frequency Division Multiplexing). TDM is beneficial in that full flexibility for 16m system optimization is supported. However, TDM may have the defect that link budget loss occurs in a legacy system. On the other hand, FDM is beneficial in that no impact in terms of link budget occurs in legacy systems. However, FDM may have the defect that 16m sub-channelization is restricted due to co-existence of resources for 16e PUSC in the same sub-frame. Specifically, TDM may have technical problems of implementation when AMC mode is used in 16e legacy system. On the other hand, FDM may have technical problems of implementation when a PUSC mode is used in a 16e legacy system.

Figure 3:
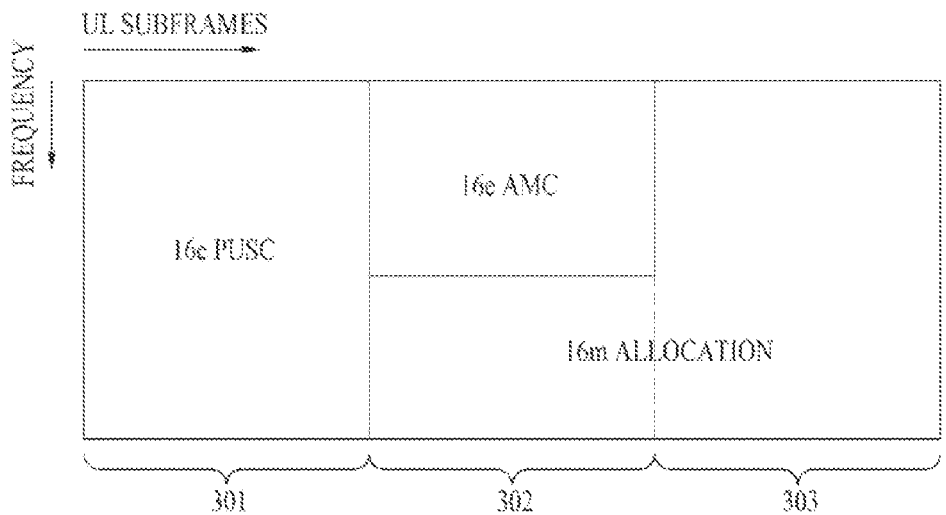
FIGS. 3 to 5 show an exemplary logical multiplexing structure according to one embodiment of the present invention.

FIG. 3 shows an exemplary logical multiplexing structure according to one embodiment of the present invention.

Referring to FIG. 3, each of zones 301, 302, and 303 includes one sub-frame. Zone 303 is reserved for '16m allocation for all types'. Here, '16m allocation for all types' includes 16m localized resource unit allocation and 16m distributed resource unit allocation. Resources for '16e PUSC' are multiplexed with resources for '16m allocation for all types' or are separated from resources for '16e AMC' in a TDM manner. '16e AMC' is multiplexed with resources for '16m allocation for all types' in TDM and/or FDM manner. Further, resources '16e AMC' and resources '16m allocation for all types' are multiplexed in zone 302 in FDM manner.

However, according to the multiplexing structure of FIG. 3, legacy coverage loss might be encountered because the time span of the zone 301 for 16e system is limited by the TDM scheme.

Figure 4:
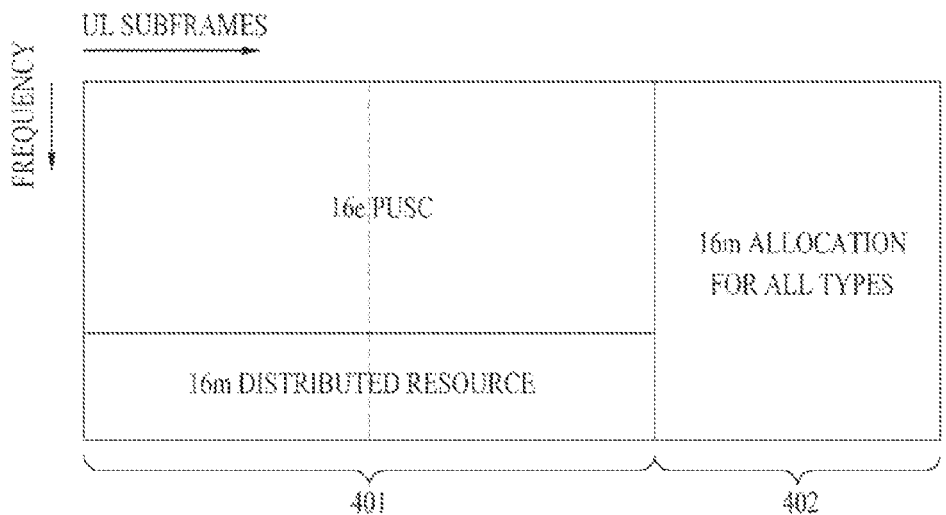

FIG. 4 shows an exemplary logical multiplexing structure according to another embodiment of the present invention.

Referring to FIG. 4, a zone 401 for '16e PUSC' and a "16m distributed resource unit (DRU) with 16e tiles/permutation rule" includes two sub-frames. A zone 402 is reserved only for '16m allocation for all types', and includes one sub-frame. Resources for '16e PUSC' and resources for the "16m distributed resource unit (DRU) with 16e tiles/permutation rule" are frequency-division multiplexed in the zone 401.

Figure 5:
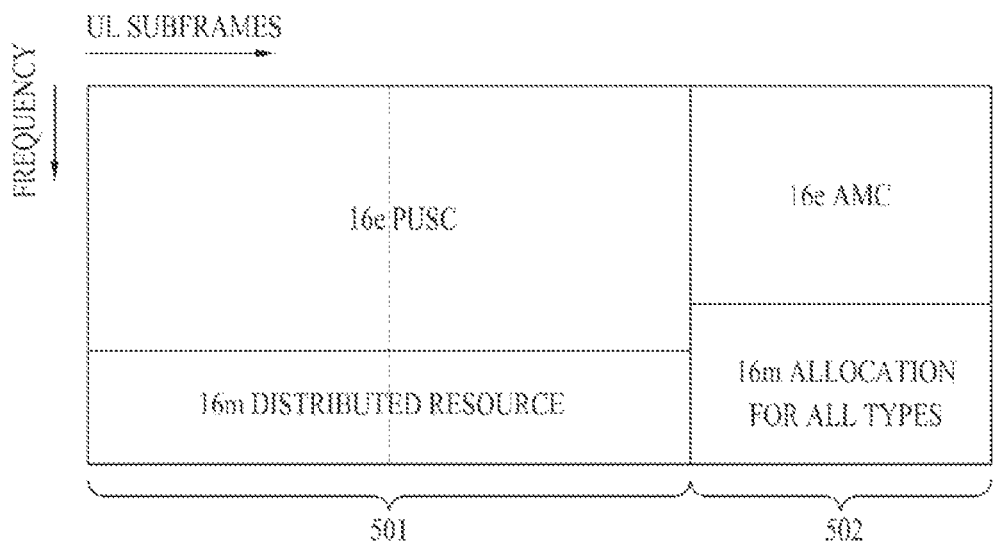

FIG. 5 shows an exemplary logical multiplexing structure according to another embodiment of the present invention.

Referring to FIG. 5, a zone 502 is reserved for '16m allocation for all types' and '16e AMC', and includes one sub-frame. A zone 501 is reserved for '16e PUSC' and "16m distributed resource unit (DRU) with 16e tiles/permutation rule," and includes two sub-frames.

Referring back to FIG. 4, it is shown that only '16m' exists in the zone 402. With the multiplexing structure of FIG. 4 or FIG. 5, legacy coverage can be extended because the time span of the '16e PUSC' zone 401 or 501 is considerably longer than that of the multiplexing structure of FIG. 3. However, according to the structure of FIG. 4 and FIG. 5, 16m system complexity may increase due to two distributed permutation rules. In these structures, if UL has three sub-frames, the '16e PUSC' zone 401 or 501 may include two sub-frames such that the size thereof supports legacy coverage, and if UL has four sub-frames, the '16e PUSC' zone 401 or 501 may include three sub-frames such that the size thereof supports legacy coverage.

Figure 6:
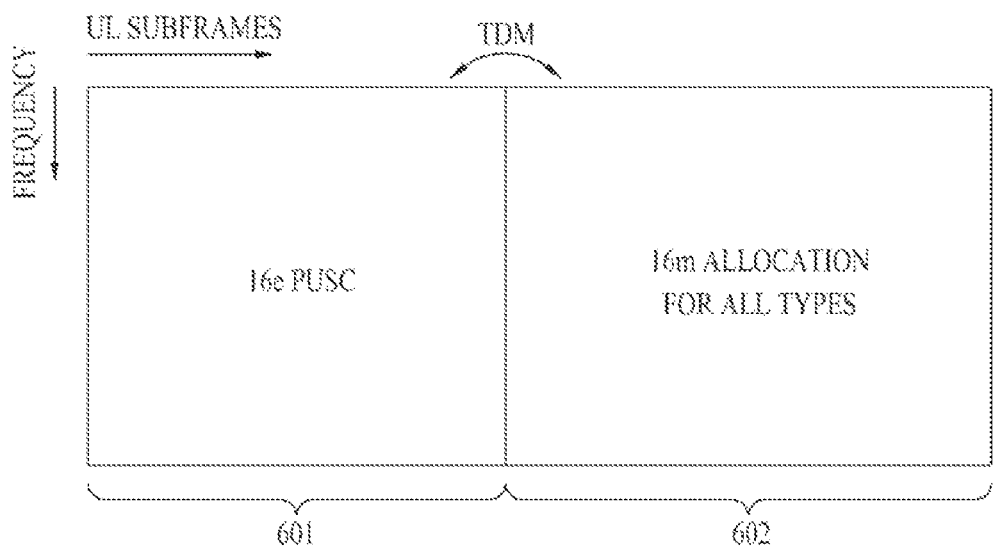
FIG. 6 shows an exemplary logical multiplexing structure according to another embodiment of the present invention when a legacy system operates only in PUSC mode for UL sub-frames.

FIG. 6 shows an exemplary logical multiplexing structure according to another embodiment of the present invention when a legacy system operates only in a PUSC mode for UL sub-frames. In this multiplexing structure, resources for '16e PUSC' and resources for '16m allocation for all types' are multiplexed in a TDM manner for legacy support. According to the multiplexing structure of FIG. 6, the adverse effects of legacy 16e system to 16m resource allocation can be minimized because the frequency granularity of the 16m resource allocation unit is not influenced by the 16e legacy system. Further, in this case, if a UL PRU (Physical Resource Unit) includes 18 sub-carriers by 6 OFDM symbols, the UL PRU can be easily applied to the multiplexed structure because it has commonality with DL PRU.

Figure 7:
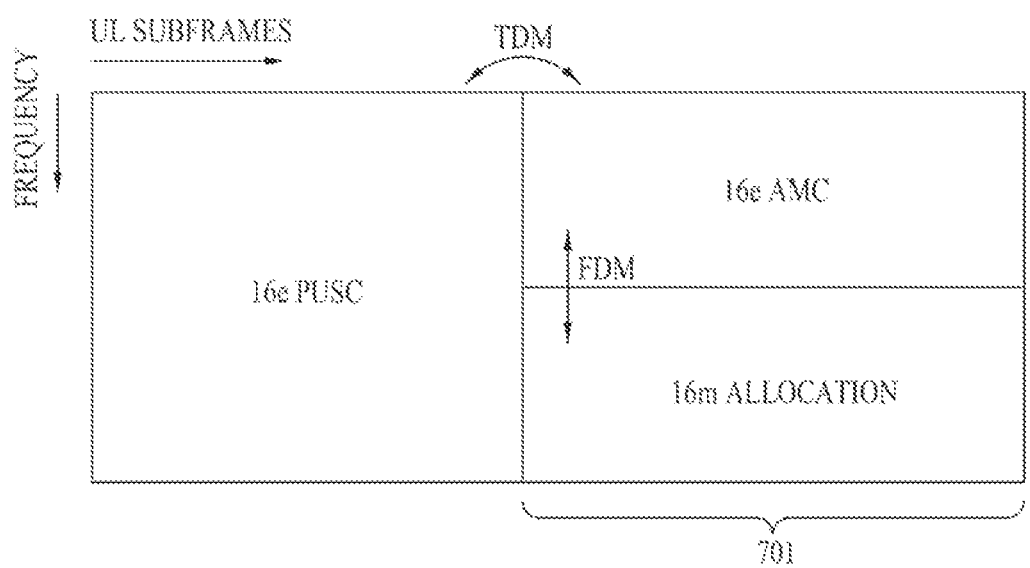
FIG. 7 shows an exemplary logical multiplexing structure according to another embodiment of the present invention when a legacy system operates in both PUSC and AMC modes for UL sub-frames.

FIG. 7 shows an exemplary logical multiplexing structure according to another embodiment of the present invention when a legacy system operates in both PUSC and AMC modes for UL sub-frames. In this multiplexing structure, resources for '16e PUSC' and resources for '16m allocation for all types' are time-division multiplexed, and resources for '16e PUSC' and resources for '16e AMC' are separated in TDM manner. On the other hand, resources for '16e AMC' and resources for '16m allocation for all types' are frequency-division multiplexed in the same zone 701.

Figure 8:
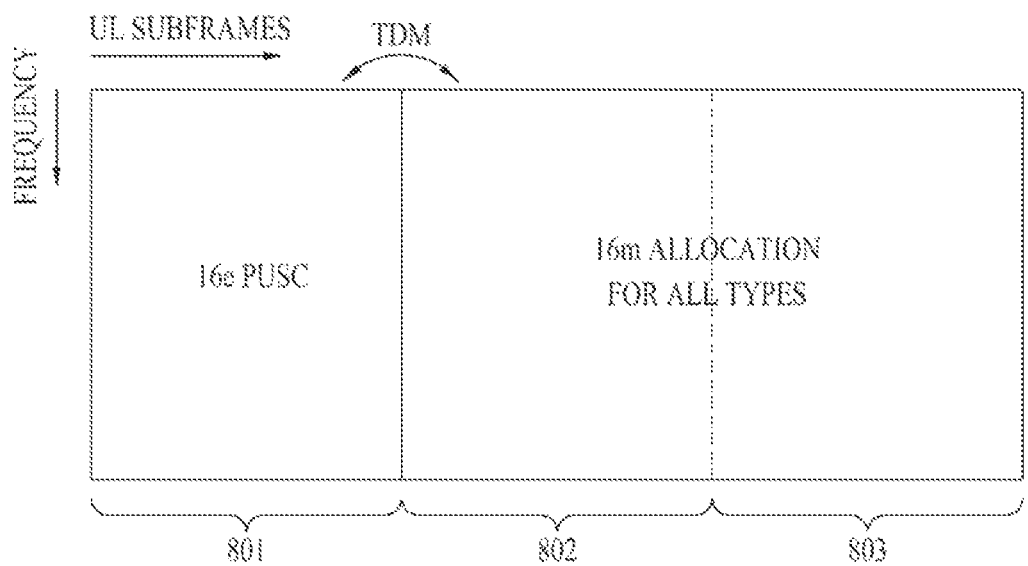
FIG. 8 shows an exemplary logical multiplexing structure according to another embodiment of the present invention when a legacy system operates only in a PUSC mode for UL sub-frames.

FIG. 8 shows an exemplary logical multiplexing structure according to another embodiment of the present invention when a legacy system operates only in PUSC mode for UL sub-frames. In this multiplexing structure, resources for '16m allocation for all types' and resources for '16e PUSC' are always time-division multiplexed, and a PRU of 18 sub-carriers by 6 OFDMA symbols can be used for 16m resource allocation without modification. Referring to FIG. 8, the multiplexing structure may include three UL sub-frames 801, 802, and 803, and '16e PUSC' is allocated in one sub-frame

801. It should be noted that the present invention is not limited to the specific time length of each zone 801, 802, or 803.

Figure 9:
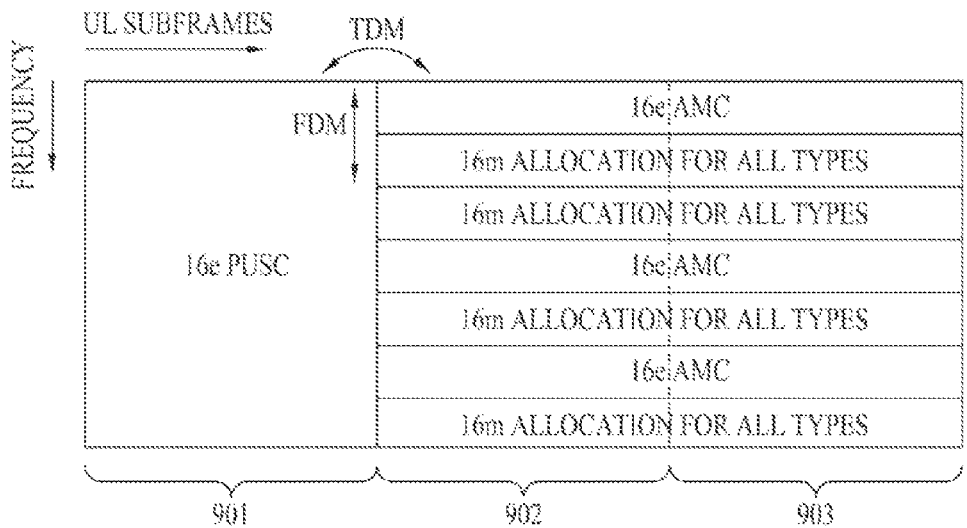
FIG. 9 shows an exemplary logical multiplexing structure according to another embodiment of the present invention when a legacy system operates both in PUSC and AMC modes for UL sub-frames.

FIG. 9 shows an exemplary logical multiplexing structure according to another embodiment of the present invention when a legacy system operates both in PUSC and AMC modes for UL sub-frames. In this multiplexing structure, resources for '16m allocation for all types' and resources for '16e PUSC' are always time-division multiplexed, resources for '16m allocation for all types' and resources for '16e AMC' are always frequency-division multiplexed, and a PRU of 18 sub-carriers by 6 OFDMA symbols can be used for 16m resource allocation without modification. Referring to FIG. 9, the multiplexing structure may include three UL sub-frames 901, 902, and 903, and '16e PUSC' is allocated in one sub-frame 901. However, it is apparent that the present invention is not limited by the exemplary structure of FIG. 9.

Figure 10:
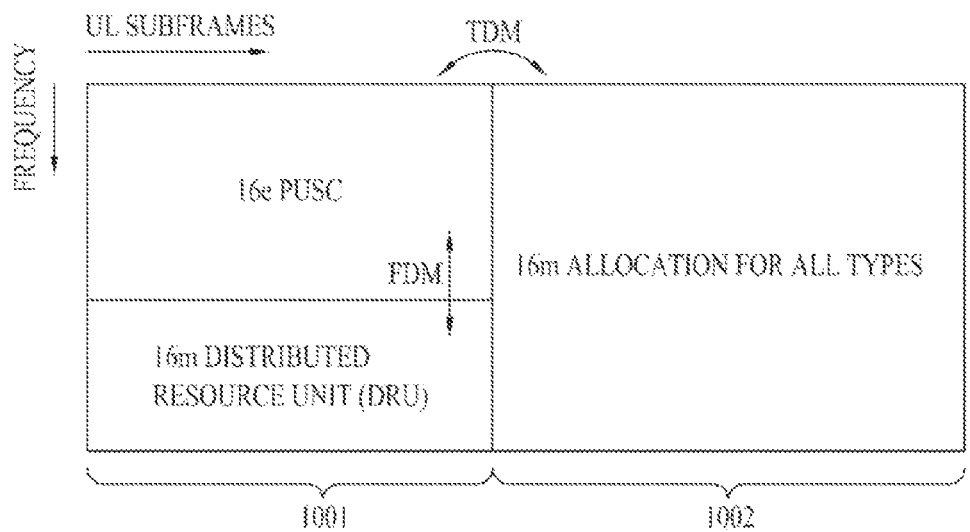
FIG. 10 shows an exemplary logical multiplexing structure according to another embodiment of the present invention when a legacy system operates only in a PUSC mode for UL sub-frames.

FIG. 10 shows an exemplary logical multiplexing structure according to another embodiment of the present invention when a legacy system operates only in a PUSC mode for UL sub-frames. In this multiplexing structure, resources for '16m' and resources for '16e PUSC' are multiplexed both in TDM and FDM manner. If '16m' supports the same tiles/permutation rules as the 16e tiles/permutation rules or supports granularity which is compatible with the granularity of '16e PUSC', '16m' can be frequency-division multiplexed with '16e PUSC' in a zone 1001. However, resources for '16m allocation for all types' can be time-division multiplexed with resources for '16e PUSC' in a zone 1002.

Figure 11:
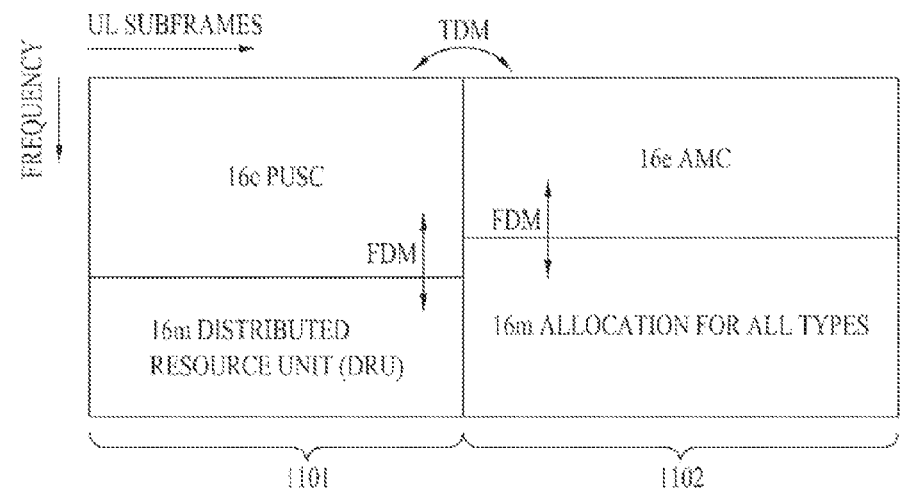
FIG. 11 shows an exemplary logical multiplexing structure according to another embodiment of the present invention when a legacy system operates both in PUSC and AMC modes for UL sub-frames.

FIG. 11 shows an exemplary logical multiplexing structure according to another embodiment of the present invention when a legacy system operates both in PUSC and AMC modes for UL sub-frames. In this multiplexing structure, resources for '16m' and resources for '16e PUSC' are multiplexed both in TDM and FDM manner, and resources for '16m allocation for all types' and resources for '16e AMC' are frequency-division multiplexed. If '16m' supports the same tiles/permutation rules as the 16e tiles/permutation rules or supports granularity which is compatible with the granularity of '16e PUSC' when part of a zone 1101 remains empty after '16e PUSC' allocation, resources for '16m' can be frequency-division multiplexed with resources for '16e PUSC' in the zone 1101. However, resources for '16m allocation for all types' can be frequency-division multiplexed with resources for '16e AMC' in a zone 1102. Meanwhile, resources for '16m' can be multiplexed with resources for '16e PUSC' in TDM manner in the zone 1102. The multiplexing structure of FIG. 11 is beneficially applicable in an environment where a number of allocation modes such as '16e AMC', '16e PUSC', '16m distributed resource unit (DRU) mode', and '16m localized mode' should be allocated in a single time zone.

Figure 12:
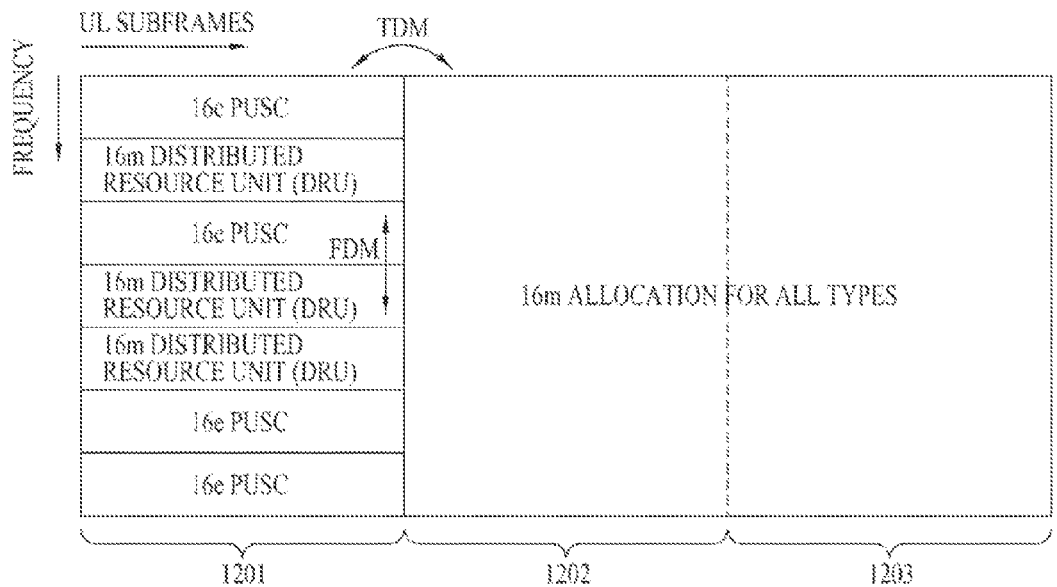
FIG. 12 and FIG. 13 show exemplary physical multiplexing structures of the logical multiplexing structures of FIG. 10 and FIG. 11, respectively.
Figure 13:
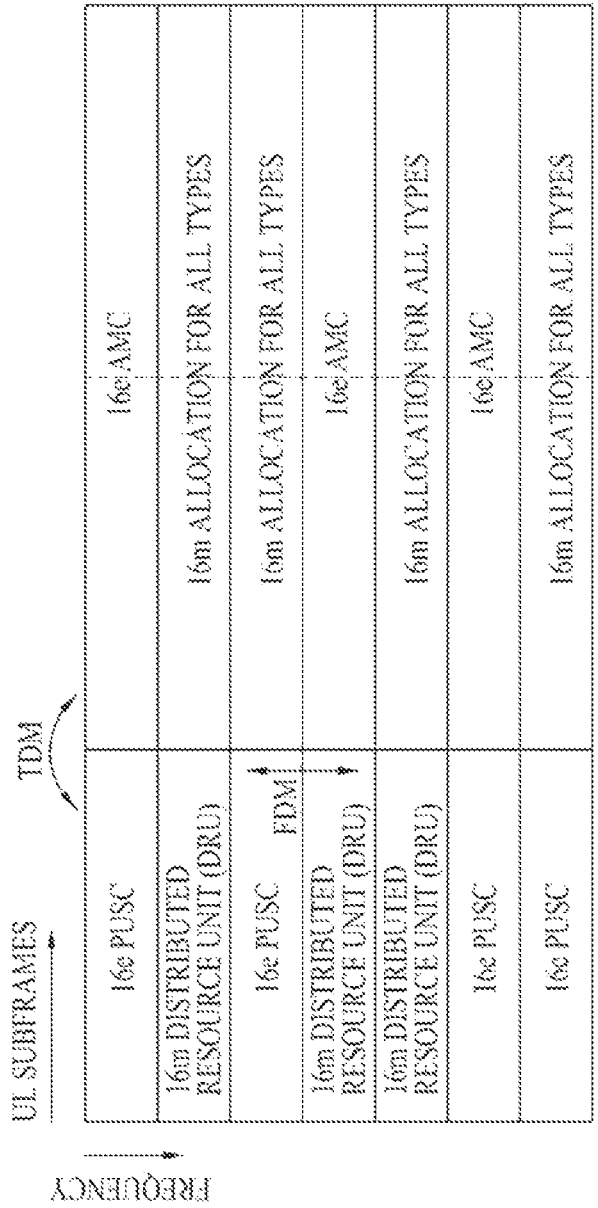

FIG. 12 and FIG. 13 show exemplary physical multiplexing structures of the logical multiplexing structures of FIG. 10 and FIG. 11, respectively.

In the physical domain shown in FIGS. 12 to 13, the 16e region and the 16m (with diversity) region of FIGS. 10 to 11 may be interlaced by a predetermined rule (e.g., the 16e PUSC permutation rule). Frequency granularity of the 16e region PUSC mode may be based on the use of 4×3 tiles. In one example, by adding two 4×3 tiles to create a composite 4×6 tile for the 16e mode, and by restricting the 16m mode to have tiles of size 4×6, a common tile structure (i.e., 4×6) is used in both the 16e and 16m regions. These common tile structures may be interlaced in the frequency domain in any predetermined order (e.g., 16e followed by one or more 16m followed by one or more 16e). Interlacing of these specifically sized tiles allows for efficient frequency use. These specifically sized tiles may also be time division multiplexed with differently sized tiles (i.e., integer multiples of 4×6), such as tiles for '16e AMC' and/or '16m allocation for all types'.

Figure 14:
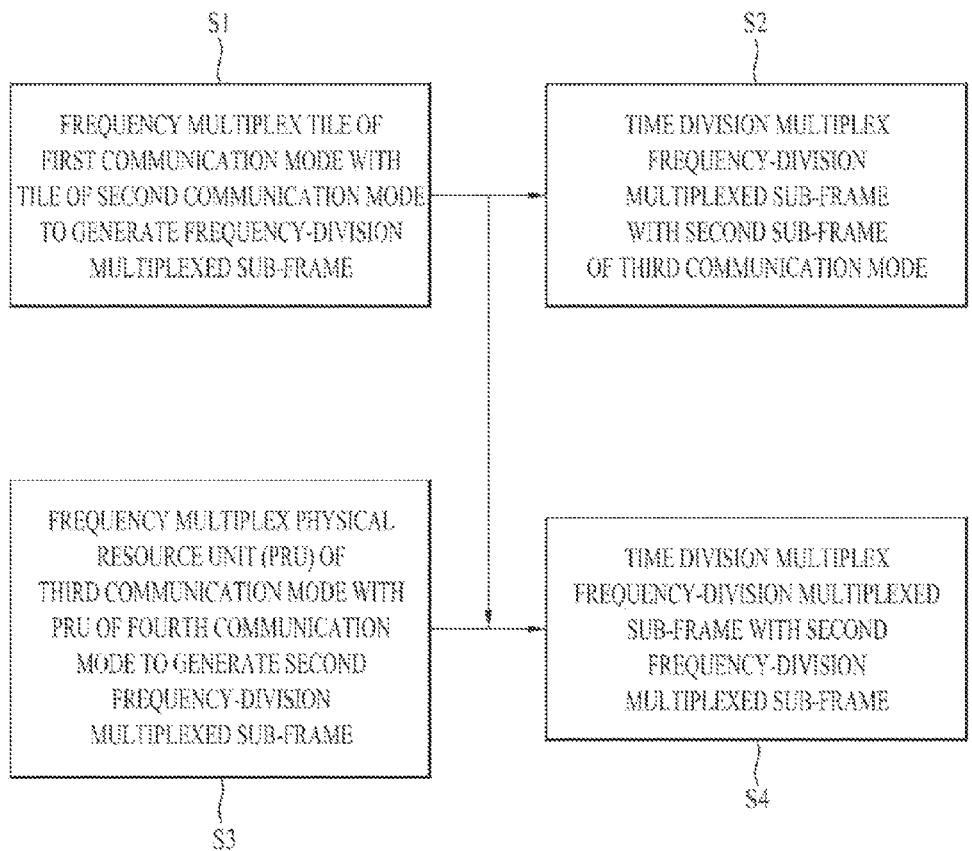
FIGS. 14 and 15 show methods for multiplexing and demultiplexing the frames shown in FIG. 13.
Figure 15:
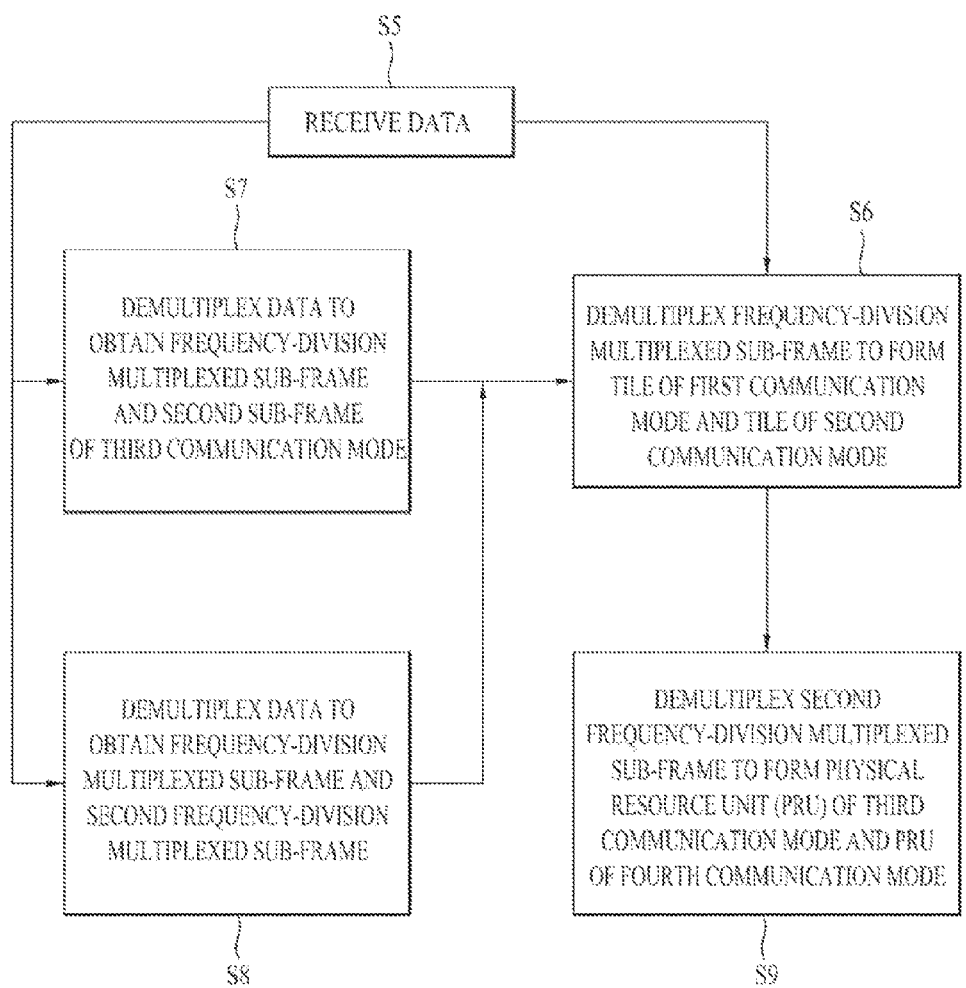

FIGS. 14 and 15 show methods for multiplexing and demultiplexing the frames shown in FIG. 13. Once data is ready to transmit, a device frequency-division multiplexes a tile of a first communication mode with a tile of a second communication mode to create a frequency-division multiplexed sub-frame (or a sub-frame group) (S1) (e.g., the sub-frame (sub-frame group) 1101 of FIG. 11). The tile of the first communication mode may include X1 contiguous sub-carriers and Y1 contiguous OFDMA symbols. The tile of the second communication mode may include X2 contiguous sub-carriers and Y2 contiguous OFDMA symbols. The multiple may be an integer multiple (e.g., X1=X2=4, Y1=3, and Y2=6). The first communication mode may include PUSC (Partial Usage of Sub-Channels) sub-channelization. The second communication mode may include tile permutation.

Optionally, the device time division multiplexes the frequency multiplexed sub-frame (or the sub-frame group) with a second sub-frame of a third communication mode (e.g., one of the sub-frames 1102 of FIG. 11) (S2). The third communication mode may include adjacent sub-carrier permutation (AMC) or may include distributed sub-carrier permutation.

As another option, the device may frequency-division multiplex a Physical Resource Unit (PRU) of a third communication mode with a PRU of a fourth communication mode to create a second frequency-division multiplexed sub-frame (or a sub-frame group) (e.g., one of the sub-frames 1102 of FIG. 11) (S3). Optionally, the device then time division multiplexes the frequency multiplexed sub-frame (or the sub-frame group) with the second frequency multiplexed sub-frame (or the sub-frame group) (S4). The PRU of the third communication mode may include X3 contiguous sub-carriers and Y3 contiguous OFDMA symbols. The PRU of the fourth communication mode may include X4 contiguous sub-carriers and Y4 contiguous OFDMA symbols. In one option, X3=X4 and Y4 is a multiple of Y3 (e.g., X3=18, Y3=3, and Y4=6). The third communication mode may include adjacent sub-carrier permutation (AMC), and the fourth communication mode may include distributed sub-carrier permutation.

The method of FIG. 15 is the inverse of FIG. 14. FIG. 15 shows a post reception method for creating the structures shown in FIGS. 11 and 13. Once data is received (S5), a device frequency demultiplexes a frequency multiplexed sub-frame (or a sub-frame group) to form a tile of a first communication mode and a tile of a second communication mode (S6). Optionally, the device time division demultiplexes the received data to form the tile of the first communication mode and the second communication mode (S6). Optionally, the device time division demultiplexes received data to obtain the frequency multiplexed sub-frame (or the sub-frame group) and a second sub-frame (or a sub-frame group) of a third communication mode (S7). Alternatively, the device time division demultiplexes data to obtain the frequency-division multiplexed sub-frame (or the sub-frame group) and a second frequency-division multiplexed sub-frame (or a sub-frame group) (S8). With this alternative, the device may also frequency-division demultiplex the second frequency-division multiplexed sub-frame (or the sub-frame group) to form a Physical Resource Unit (PRU) of a third communication mode and a PRU of a fourth communication mode (S9) and frequency-division demultiplex the frequency-division multiplexed sub-frame (or the sub-frame group) to form a tile of a first communication mode and a tile of a second communication mode (S6).

Figure 16:
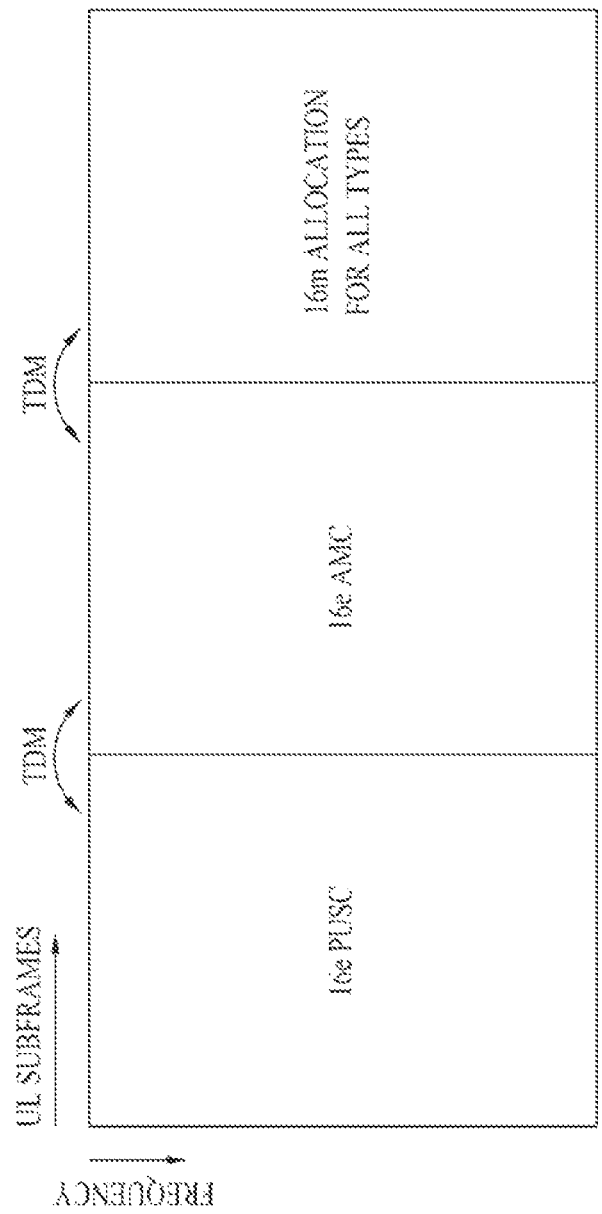
FIG. 16 shows an exemplary logical multiplexing structure according to another embodiment of the present invention when a legacy system operates both in PUSC and AMC modes for UL sub-frames.

FIG. 16 shows an exemplary logical multiplexing structure according to another embodiment of the present invention when a legacy system operates both in PUSC and AMC modes for UL sub-frames. In this multiplexing structure, resources for '16e PUSC' are separated from resources for '16e AMC' in TDM manner as in conventional methods, and resources for '16m' are time-division multiplexed with resources for '16e PUSC' and resources for '16e AMC'. According to the multiplexing structure of FIG. 16, the adverse effect of the legacy 16e system to 16m resource allocation can be minimized because the frequency granularity of 16m resource allocation is not influenced by the 16e legacy system. Further, in this case, if a UL PRU (Physical Resource Unit) includes 18 sub-carriers by 6 OFDM symbols, the UL PRU can be easily applied to the multiplexed structure because it has commonality with DL PRU.

Figure 17:
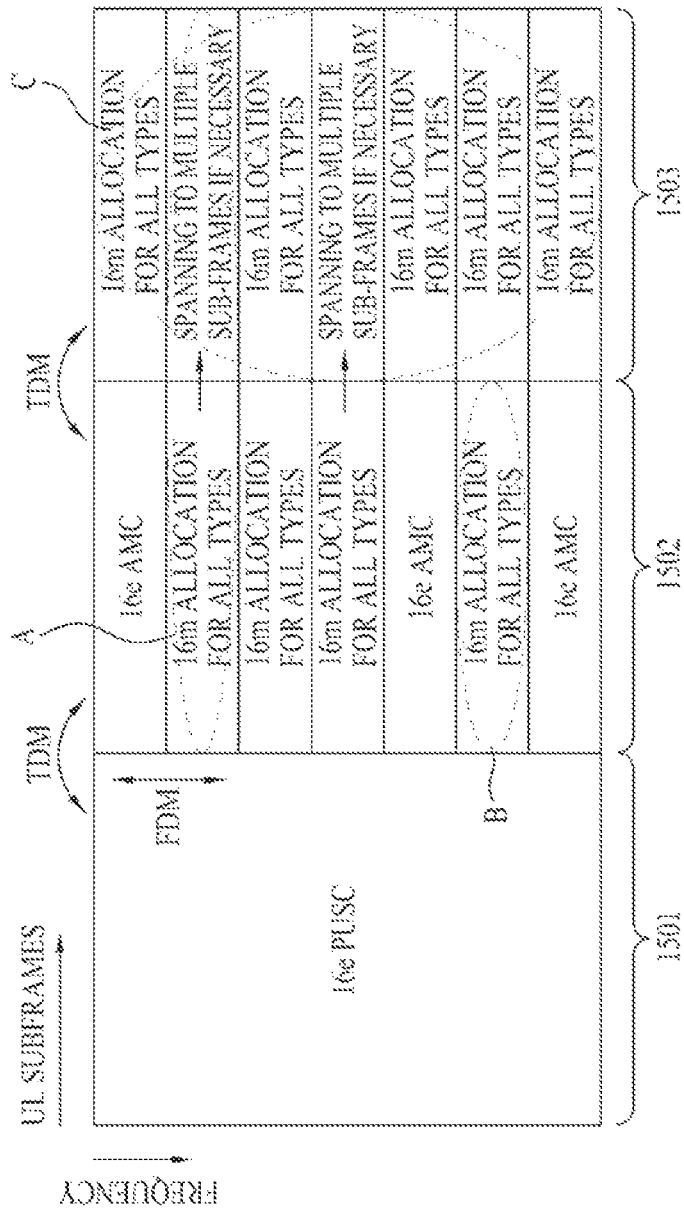
FIG. 17 shows an exemplary multiplexing structure according to another embodiment of the present invention when a legacy system operates both in PUSC and AMC modes for UL sub-frames.

FIG. 17 shows an exemplary multiplexing structure according to another embodiment of the present invention when a legacy system operates both in PUSC and AMC modes for UL sub-frames. Referring to FIG. 17, it is shown that a zone 1503 is reserved only for '16m allocation for all types', and may include one or more sub-frames. In a zone 1503, resources for '16m' can be time-division multiplexed both with resources for '16e PUSC' and resources for '16e AMC'. In this multiplexing structure, resources for '16e PUSC' are multiplexed with resources for '16m allocation for all types' in TDM manner, and resources for '16e AMC' may be multiplexed with resources '16m allocation for all types' in TDM and/or FDM manner.

According to the multiplexing structure of FIG. 17, the adverse effects of the legacy 16e system on 16m resource allocation can be minimized because the frequency granularity of 16m resource allocation is not influenced by the 16e legacy system. Further, the effect of the legacy 16e system on 16m resource allocation can be minimized if the size of the PRU used in a zone 1502 is 18 sub-carriers by 6 OFDM symbols, because the frequency granularity of '16m allocation for all types' is the same as that of '16e AMC'.

If one or more UL sub-frames are not allocated for '16e PUSC' and '16e AMC', resources for '16m allocation for all types' can be multiplexed with resources for '16e AMC' in TDM manner.

In this case, the '16m allocation for all types' in the zone 1502 may not have sufficient band-scheduling gain or frequency diversity gain because '16m localized resource unit' and '16m distributed resource unit' in the zone 1502 are frequency-division multiplexed with '16e AMC'. Therefore, it is advantageous for resources for '16m allocation for all types' to be time-division multiplexed with resources for '16e AMC' in the zone 1503. However, time-division multiplexing resources for '16m' with resources for '16e AMC' may cause UL coverage problems because the time span for '16m' in the zone 1503 may not be sufficient. To solve this problem, the sub-frame of zone 1502 may span or be concatenated to the adjacent sub-frame(s) of the zone 1503 for 16m allocation. Referring to FIG. 17, the 16m resources frequency-division multiplexed with resources for '16e AMC' may span adjacent next sub-frame(s) (A) or not (B), and the 16m resources time-division multiplexed with resources for '16e AMC' may span adjacent precedent sub-frame(s) or not (C). Spanning the 16m resources to adjacent sub-frame(s) is advantageous for cell edge users because it may provide more UL coverage.

According to the multiplexing structure of FIG. 17, resources for '16m allocation for all types' can be multiplexed both in FDM and TDM manner with resources for '16e AMC'. In other words, hybrid FDM/TDM is supported between 16e AMC and 16m. As a result, a base station can obtain flexibility as a trade-off between UL coverage and band-scheduling/diversity gain. In other words, a base station can obtain flexibility because zone 1503 which is reserved only for '16m allocation for all types' is provided when a legacy system operates both in PUSC and AMC modes.

Figure 18:
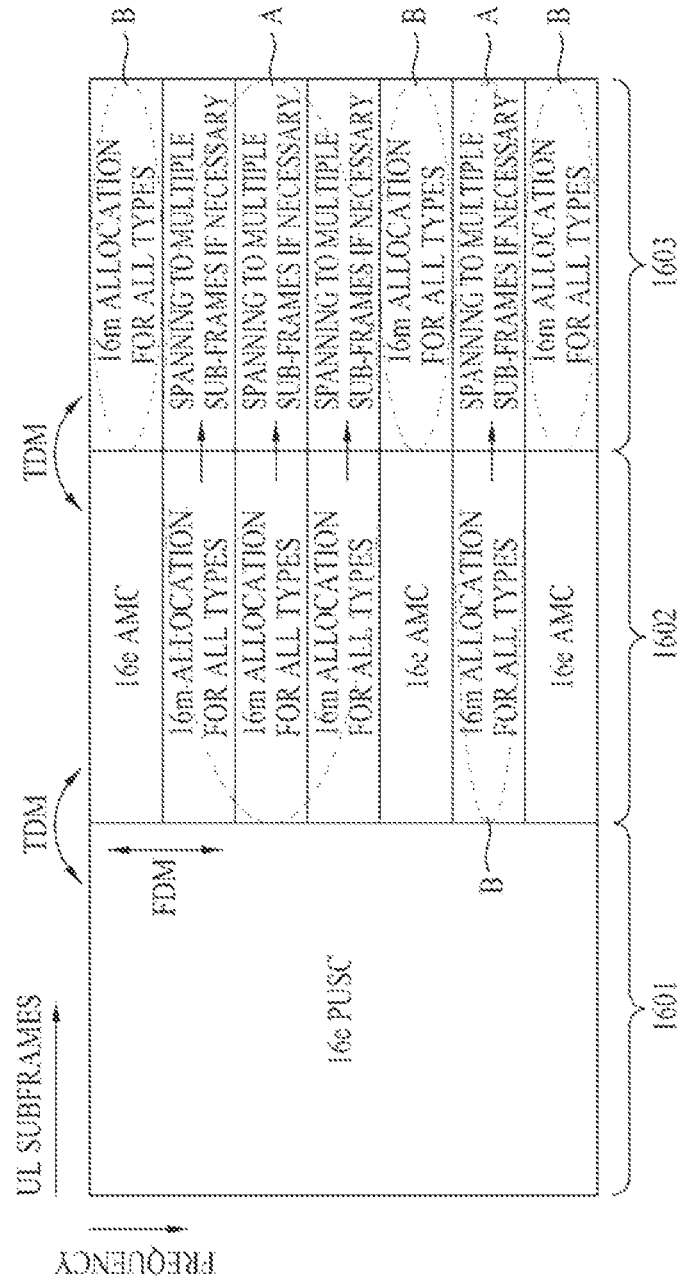
FIG. 18 shows an exemplary multiplexing structure according to another embodiment of the present invention when a legacy system operates both in PUSC and AMC modes for UL sub-frames.

FIG. 18 shows an exemplary multiplexing structure according to another embodiment of the present invention when a legacy system operates both in PUSC and AMC modes for UL sub-frames.

The multiplexing structure of FIG. 18 can be regarded as modified from the multiplexing structure of FIG. 17. According to FIG. 18, all resources for '16m allocation for all types' in zone 1602, which is frequency-division multiplexed with resources for '16e AMC', spans the adjacent next sub-frame(s) (A). These spanning resources may be allocated only for those MSs which are located at cell edges or for those MSs which are more concerned with power optimization in band-scheduling gain or diversity gain. On the other hand, resources for '16m allocation for all types' in a zone 1603 (B), which is complementary to those spanning resources discussed above, and which is time-division multiplexed with resources for '16e AMC', may be allocated only for those MSs which have less concern for power optimization or for those MSs which are not located at a cell edge.

Figure 19:
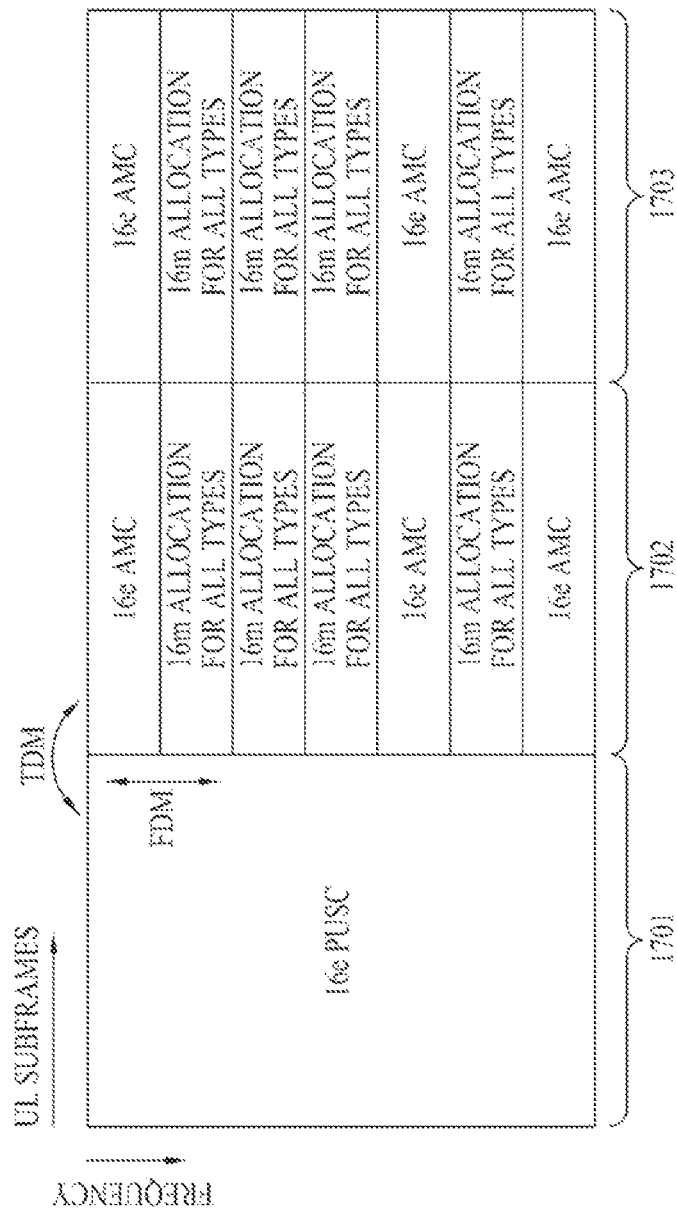
FIG. 19 shows an exemplary multiplexing structure according to another embodiment of the present invention when a legacy system operates both in PUSC and AMC modes for UL sub-frames.

FIG. 19 shows an exemplary multiplexing structure according to another embodiment of the present invention when a legacy system operates both in PUSC and AMC modes for UL sub-frames. Referring to FIG. 19, it is shown that at least part of each sub-frame 1701, 1702 or 1703 is allocated for either resources for '16e PUSC' or resources for '16e AMC'. In this multiplexing structure, resources '16e PUSC' are multiplexed with resources for '16m allocation for all types' in TDM manner, resources for '16e PUSC' are separated from resources for '16e AMC' in TDM manner, and resources for '16e AMC' are multiplexed with resources for '16m allocation for all types' only in FDM manner. Therefore, every resource for 16m in the zone 1702 has a chance to span to adjacent next sub-frame(s) in the zone 1703 for UL coverage increase.

According to the multiplexing structure of FIG. 19, the adverse effect of the legacy 16e system on 16m resource allocation can be minimized because the frequency granularity of 16m resource allocation is not influenced by '16e PUSC'. Further, the adverse effects of the legacy 16e system on 16m resource allocation can be minimized if a PRU of 18 sub-carriers by 6 OFDM symbols is used for '16m' because then frequency granularity of '16m' is the same as that of '16e AMC'.

According to the present invention, information regarding the zone configuration of resource allocation of 16e or 16m can be signaled to IEEE 802.16m MS. Such signaling may be performed in a broadcast manner. For an example, it can be signaled in which mode among PUSC and AMC the 16e system operates at each sub-frame. For another example, when resources for '16m' are frequency-division multiplexed at a sub-frame where '16e' operates in the AMC mode, information regarding resource allocation of '16e AMC' can be signaled to IEEE 802.16m MS. For still another example, when resources for '16m' are frequency-division multiplexed at a sub-frame where '16e' operates in PUSC mode, information regarding resource allocation of '16e PUSC' information regarding resource allocation of '16m' can be signaled to IEEE 802.16m MS if resources for '16m' support the same tiles/permutation rules as the 16e tiles/permutation rules or support granularity which is compatible with the granularity of '16e PUSC'. Signaling information regarding resource allocation of '16e PUSC' or '16m' is identical to the meaning that information regarding available resources of 16m is signaled because 16e PUSC and 16m are frequency-division multiplexed.

FIG. 20 is a diagram illustrating a method of configuring all sub-channels in a bitmap format and configuring available resource allocation information. As shown in FIG. 20, if the information regarding available sub-channels among all sub-channels is configured in bitmap format, the size of the bitmap is increased and thus signaling overhead is increased.

FIG. 21 is a diagram illustrating a method for transmitting resource allocation information according to an embodiment of the present invention. In an environment in which basic resource units, sub-channels, PRUs or slot frequency sizes of the 16e system and the 16m system are the same, information regarding available sub-channels to all sub-channels is not configured as a bitmap to be transmitted to the 16m MS as shown in FIG. 18, but information regarding a total number of available sub-channels is transmitted to the 16m MS as shown in FIG. 21. The 16m MSs can recognize the positions of available sub-channels in a logical domain using a predetermined permutation equation (or other information or predetermined information) and the positions of available sub-channels in a physical domain when aware of the total number of available sub-channels. As shown in FIG. 21, if the number of sub-channels available for the 16m MS among all sub-channels is 3, the number may be configured as a bitmap and 11 which is bitmap information may be transmitted to the 16m MS.

In such a transmission method, information regarding the total number of available sub-channels may be transmitted to all 16m MSs and if necessary, information regarding the total number of available sub-channels may be transmitted to partial groups of 16m MSs.

In addition, in a method of signaling the total number, the number information may be transmitted in bitmap format. For example, if the total number is 0 to 7, the bitmap may be set to any one of 000, 001, 010, 011, 100, 101, 110 and 111 and may be transmitted. In addition, other methods are applicable in addition to the method using the bitmap format.

In order to reduce signaling overhead, instead of the method of signaling information regarding the number of available sub-channels to the 16m MS, the number of sub-channels used by the 16e MS, that is, the number of non-available sub-channels, may be signaled because signaling overhead can be further reduced when the number of sub-channels available for the 16m MS is greater than the number of non-available sub-channels.

Figure 22:
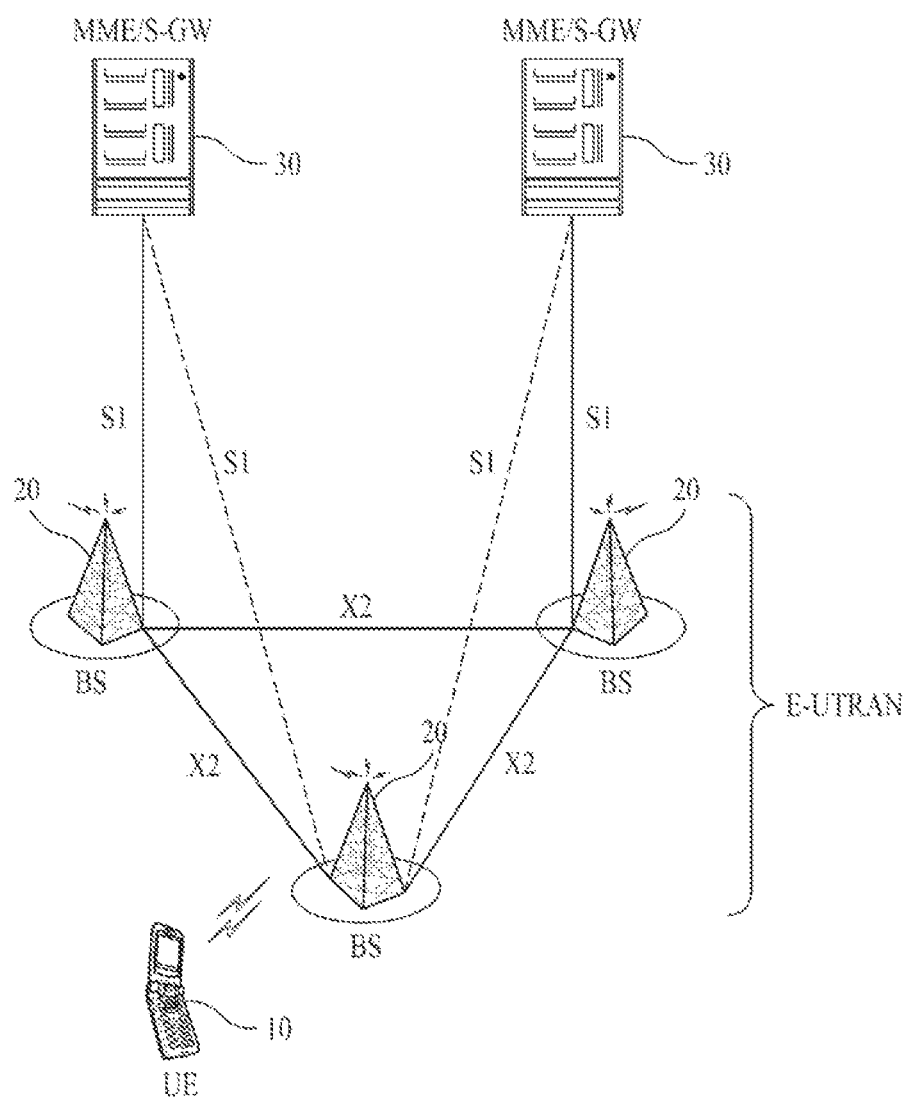
FIG. 22 is a diagram showing a structure of a wireless communication system according to an embodiment of the invention.

The information may be broadcast to the 16m MSs through a super frame header (SFH) or a system configuration control channel other than the SFH. If the information is transmitted through the SFH, the information may be signaled through a Primary-SFH (P-SFH) or a Secondary-SFH (S-SFH) according to a transmission period or a transmission content type. Referring to FIG. 22, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to by other terms, such as an evolved node-B (eNB), base transceiver system (BTS), access point, etc. One or more cells exist within the coverage of the BS 20. Interfaces for transmitting user traffic or control traffic may be used between the BSs 20.

Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected to an evolved packet core (EPC) by means of an S1 interface, more specifically, to a mobility management entity (MME)/serving gateway (S-GW) 30. The S1 interface supports a many-to-many relation between the BS 20 and the MME/S-GW 30.

Figure 23:
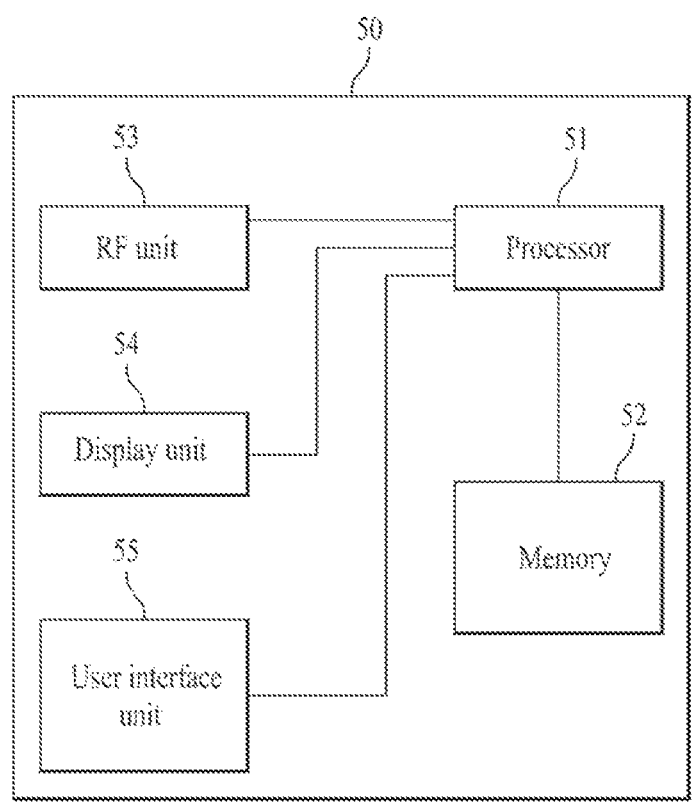
FIG. 23 is a block diagram showing constitutional elements of a user equipment according to an embodiment of the invention.

FIG. 23 is a block diagram showing constitutional elements of a device 50. The device 50 can be either the UE or the BS of FIG. 21. The device 50 is capable of exchanging the data structures of FIGS. 3 to 17 and 20 to 21. The device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If the device 50 is a UE, the display unit 54 displays a variety of information 50 and may be a well-known element such as a liquid crystal display (LCD), an organic light emitting diode (OLED), etc. The user interface unit 55 can be configured through a combination of well-known user interfaces such as a keypad, a touch screen, etc. The RF unit 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Also, one skilled in the art would recognize that, for each of the above described embodiments, multiple tiles distributed in the frequency domain may form one distributed resource unit (DRU).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to systems which support an IEEE Standard 802.16e legacy system.

The invention claimed is:

1. A method for transmitting resource allocation information at a base station in a wireless mobile communication system that supports a legacy system communication mode and a new system communication mode, the method comprising:
transmitting broadcast information,
wherein the broadcast information contains number information that represents a number of first resource units available for the legacy system communication mode so as to inform a mobile communication device operating in the new system communication mode of second resource units available for the new system communication mode among a plurality of resource units into which a frequency band available to the base station is divided in a frequency domain, wherein the frequency band is divided into a first frequency resource zone which is comprised of the first resource units in a certain time zone and a second frequency resource zone which is comprised of the second resource units in the certain time zone, wherein the first frequency resource zone and the second frequency resource zone are contiguous in the frequency domain, wherein the first frequency resource zone is dedicated to the legacy system communication mode in the certain time zone, and wherein the second frequency resource zone is dedicated to the new system communication mode in the certain time zone.

2. The method according to claim 1, further comprising:
receiving transmission of a first mobile communication device operating in the legacy system communication mode within the first resource units in the certain time zone; and
receiving transmission of a second mobile communication device operating in the new system communication mode within the second resource units in the certain time zone.

3. The method according to claim 1, wherein the broadcast information is configured in a bitmap format.

4. A method for receiving resource allocation information at a mobile communication device in a wireless mobile communication system that supports a legacy system communication mode and a new system communication mode, the method comprising:
receiving broadcast information from a base station,
wherein the broadcast information contains number information,
wherein the number information represents a number of first resource units available for the legacy system communication mode among a plurality of resource units into which a frequency band available to the base station is divided in a frequency domain; and
recognizing second resource units available for the new system communication mode based on the number information that represents the number of the first resource units,
wherein the frequency band is divided into a first frequency resource zone which is comprised of the first resource units in a certain time zone and a second frequency resource zone which is comprised of the second resource units in the certain time zone,
wherein the first frequency resource zone and the second frequency resource zone are contiguous in the frequency domain,
wherein the first frequency resource zone is dedicated to the legacy system communication mode in the certain time zone, and
wherein the second frequency resource zone is dedicated to the new system communication mode in the certain time zone.

5. The method according to claim 4, further comprising:
performing transmission within the first resource units in the certain time zone when the mobile communication device is a first mobile communication device which operates in the legacy system communication mode, and performing transmission within the second resource units in the certain time zone when the mobile communication device is a second mobile communication device which operates in the new system communication mode.

6. The method according to claim 4, wherein the broadcast information is configured in a bitmap format.

7. A mobile communication device which wirelessly communicates with a base station that supports a legacy system communication mode and a new system communication mode, the mobile communication device comprising:
a Radio Frequency (RF) unit configured to receive broadcast information from the base station,
wherein the broadcast information contains number information,
wherein the number information represents a number of first resource units available for the legacy system communication mode among a plurality of resource units into which a frequency band available to the base station is divided in a frequency domain; and
a processor electrically connected to the RF unit and configured to recognize second resource units available for the new system communication mode based on the number information that represents the number of the first resource units,
wherein the frequency band is divided into a first frequency resource zone which is comprised of the first resource units in a certain time zone and a second frequency resource zone which is comprised of the second resource units in the certain time zone,
wherein the first frequency resource zone and the second frequency resource zone are contiguous in the frequency domain,
wherein the first frequency resource zone is dedicated to the legacy system communication mode in the certain time zone, and
wherein the second frequency resource zone is dedicated to the new system communication mode in the certain time zone.

8. The mobile communication device according to claim 7, wherein the processor is further configured to control the RF unit to perform transmission within the first resource units in the certain time zone when the mobile communication device is a first mobile communication device which operates in the legacy system communication mode, and control the RF unit to perform transmission within the second resource units in the certain time zone when the mobile communication device is a second mobile communication device which operates in the new system communication mode.

9. The mobile communication device according to claim 7, wherein the broadcast information is configured in a bitmap format.

10. A base station which wirelessly communicates with a mobile communication device and supports a legacy system communication mode and a new system communication mode, the base station comprising:
a Radio Frequency (RF) unit; and
a processor electrically connected to the RF unit and configured to control the RF unit to transmit broadcast information,
wherein the broadcast information contains number information that represents a number of first resource units available for the legacy system communication mode so as to inform a mobile communication device operating in the new system communication mode of second resource units available for the new system communication mode among a plurality of resource units into which a frequency band available to the base station is divided in a frequency domain, wherein the frequency band is divided into a first frequency resource zone which is comprised of the first resource units in a certain time zone and a second frequency resource zone which is comprised of the second resource units in the certain time zone, wherein the first frequency resource zone and the second frequency resource zone are contiguous in the frequency domain, wherein the first frequency resource zone is dedicated to the legacy system communication mode in the certain time zone, and wherein the second frequency resource zone is dedicated to the new system communication mode in the certain time zone.

11. The base station according to claim 10, wherein the RF unit is configured to receive transmission of a first mobile communication device operating in the legacy system communication mode within the first resource units in the certain time zone and receive transmission of a second mobile communication device operating in the new system communication mode within the second resource units in the certain time zone.

12. The base station according to claim 10, wherein the broadcast information is configured in a bitmap format.

* * * * *